(12) United States Patent
Kallarackal et al.

(10) Patent No.: US 10,954,074 B2
(45) Date of Patent: Mar. 23, 2021

(54) APPARATUS, MODULAR TRACKING UNIT AND METHOD FOR CONVEYOR BELT ALIGNMENT

(71) Applicant: THEJO ENGINEERING LIMITED, Chennai (IN)

(72) Inventors: Manoj Joseph Kallarackal, Chennai (IN); Harikrishnan R Nair, Chennai (IN); Moses D, Chennai (IN); Manimaran E, Chennai (IN)

(*) Notice: Subject to any disclaimer, the term of this patent is extended or adjusted under 35 U.S.C. 154(b) by 0 days.

(21) Appl. No.: 16/760,108

(22) PCT Filed: Oct. 31, 2018

(86) PCT No.: PCT/IN2018/050706
§ 371 (c)(1),
(2) Date: Apr. 29, 2020

(87) PCT Pub. No.: WO2019/087210
PCT Pub. Date: May 9, 2019

(65) Prior Publication Data
US 2020/0331705 A1   Oct. 22, 2020

(30) Foreign Application Priority Data

Oct. 31, 2017   (IN) .............................. 201741034462

(51) Int. Cl.
| | | |
|---|---|---|
| *B65G 39/16* | (2006.01) | |
| *B65G 15/64* | (2006.01) | |
| *B65G 15/08* | (2006.01) | |
| *B65G 23/44* | (2006.01) | |

(52) U.S. Cl.
CPC ............. *B65G 39/16* (2013.01); *B65G 15/64* (2013.01); *B65G 15/08* (2013.01); *B65G 23/44* (2013.01); *B65G 2812/02168* (2013.01)

(58) Field of Classification Search
CPC ........ B65G 39/16; B65G 15/64; B65G 15/08; B65G 23/44; B65G 2812/02168; B65G 39/04
USPC ........................................................ 198/806
See application file for complete search history.

(56) References Cited

U.S. PATENT DOCUMENTS

| | | | | |
|---|---|---|---|---|
| 2,160,057 | A * | 5/1939 | Carus ..................... | B65G 39/16 198/806 |
| 2,569,419 | A * | 9/1951 | Kendall ................ | B65G 39/16 198/808 |
| 2,655,251 | A * | 10/1953 | Bankauf ................ | B65G 39/16 198/806 |

(Continued)

FOREIGN PATENT DOCUMENTS

WO   WO-2013186790 A1 * 12/2013   .......... B65G 39/125

*Primary Examiner* — Mark A Deuble
(74) *Attorney, Agent, or Firm* — Rumit Ranjit Kanakia (57) ABSTRACT

The various embodiments of the present invention disclose an apparatus, modular tracking unit and a method for conveyor belt alignment. The apparatus provides alignment sustenance and wide-angle coverage. The apparatus includes a plurality of modular tracking units, a linking mechanism including a connecting rope passing through a link of each of the modular tracking units and a pair of guide rollers. The invention triggers the pair of guided rollers on misalignment of the conveyor belt from original path. The guided roller activates the linking mechanism to move the modular tracking units in tandem for re-aligning the conveyor belt.

16 Claims, 10 Drawing Sheets

(56) References Cited

U.S. PATENT DOCUMENTS

| | | | | |
|---|---|---|---|---|
| 3,058,574 | A | * | 10/1962 | Gianukos .............. B65G 39/16 198/806 |
| 3,133,626 | A | | 5/1964 | Dargue |
| 3,693,781 | A | * | 9/1972 | Homeier ................ B65G 39/16 198/807 |
| 4,623,061 | A | * | 11/1986 | Pentith .................. B65G 15/04 198/805 |
| 4,650,065 | A | * | 3/1987 | Savinykh .............. B65G 21/04 198/828 |
| 5,717,984 | A | * | 2/1998 | Wong .................... B65G 39/16 198/806 |
| 6,131,726 | A | * | 10/2000 | Hovsto ................. B65G 39/16 198/806 |
| 6,405,854 | B1 | * | 6/2002 | Cumberlege ......... B65G 39/16 198/806 |
| 7,669,709 | B2 | | 3/2010 | Hovsto et al. |
| 9,346,622 | B2 | | 5/2016 | Kuiper et al. |
| 2013/0233680 | A1 | | 9/2013 | Sharp |
| 2014/0083822 | A1 | * | 3/2014 | Swinderman ......... B65G 15/08 198/827 |
| 2016/0159574 | A1 | * | 6/2016 | Gibbs ................... B65G 15/08 198/808 |
| 2019/0009992 | A1 | * | 1/2019 | Sharp ................... B65G 15/64 |

\* cited by examiner

APPARATUS, MODULAR TRACKING UNIT AND METHOD FOR CONVEYOR BELT ALIGNMENT

FIELD OF INVENTION

The present invention generally relates to a mechanical tracking system and particularly relates to a tracking system for a conveyor belt. The present invention more particularly relates to a garland shaped tacking system for the conveyor belts with variable trough angles.

BACKGROUND OF THE INVENTION

Rollers for conveyor belts are arranged so that the conveyor belt travels thereover in a downstream belt travel direction and path. However, conveyor belts can tend to meander or mistrack laterally toward one side or the other of the rollers due to reasons. Conveyor belt tracking devices have been developed that respond to belt mistracking to attempt to redirect the belt back to its correct travel path substantially centered on the conveyor rollers.

One type of belt tracking device configured to correct a misaligned belt has sensor rollers that are mounted to arms that are each operationally connected to a frame for tracking or training rollers under a belt. If the belt becomes misaligned, it will forcefully engage the sensor roller at the misaligned side, which will cause the arms to force the belt training roller to pivot for steering the belt back toward its proper downstream travel path. However, the sensor rollers are generally located upstream or downstream of the training rollers to create the necessary moment arm for pivoting the rollers. This upstream or downstream mounting of the sensor rollers means that the correcting mechanism is limited to use when the belt travels in a single direction. Furthermore, this solution requires the edge of the belt to forcefully make contact with the sensor rollers, which can undesirably damage the belt.

One of such prior arts discloses a tracking apparatus and method for urging a mistracking conveyor belt back towards a correct travel path are provided. The apparatus and method both utilize downstream shifting of an end portion of an idler roller due to mistracking of the conveyor belt for directing or steering the belt back toward its correct travel path and a reaction force from the belt due to the steering thereof for energizing a tilting action of the idler roller to raise the downstream end portion thereof. In this manner, the tilting of the idler roller is not mechanically coupled to the downstream shifting of the roller end portion allowing the belt tracking apparatus herein to be bi-directional for use with conveyor belts that may be run in opposite travel directions.

In the view of foregoing, there is a need for an improved apparatus and method for overcoming the short comings associated with prior arts.

SUMMARY OF THE INVENTION

The various embodiments of the present invention disclose a conveyor belt aligning apparatus, a tracking unit for the apparatus and a method of re-aligning a conveyor belt. The invention provides alignment sustenance and wide-angle coverage. The conveyor belt aligning apparatus includes a plurality of modular tracking units (101) mounted on a pair of parallel ropes (122) with spacers (124) between each tracking unit wherein the modular units (101) are placed between a first end (109a) and a second end (109b) of a support frame (109) such that the parallel ropes (122) bend over at least one pair of pulleys (120, 121) each of the first end (109a) and the second end (109b) of the support frame (109), each of the modular tracking units (101) comprises a tracking roller (102) attached to a support bracket (106) wherein the bracket (106) is mounted on a roller base (103) through a pivot pin (104) wherein a link (105) perpendicular to the tracking roller is affixed to a bottom of the pivot pin (104). The apparatus includes a linking mechanism including a connecting rope (110) passing through the link (105) of each of the modular tracking units (101), a pair of guide rollers (111, 117) connected to the support frame (109) and the linking mechanism, wherein the conveyor belt (118) when misaligned touches one guide roller of the pair of guide rollers (111, 117) to initiate a realignment mechanism such that the touch activates the linking mechanism as the touched guide roller pulls the connecting rope (110) for enabling the links (105) of the units (101) to move in tandem and rotate the pivot (104) thereby aligning the tracking roller (102) attached to the pivot (104) for steering back the belt to centre.

In a related embodiment, the pair of guide rollers (111, 117) include a first guide roller (111) and a second guide roller (117). The first guide roller (111) is connected to the first end (109a) of the support frame (109) through a first frame arm (112) and connected to the linking mechanism through a first steering arm (115) wherein the first steering arm (115) is connected to the link of a modular tracking unit (101a) nearest to the first end (109a) of the support frame (109). The second guide roller (117) is connected to the second end (109b) of the support frame (109) through a second frame arm (119) and connected to the linking mechanism through a second steering arm (116) wherein the second steering arm (116) is connected to the link of a modular tracking unit (101b) nearest to the second end (109b) of the support frame (109).

In an embodiment, the present invention provides a tracking unit for a conveyor belt (118) aligning apparatus. The tracking unit includes a tracking roller (102) attached to a support bracket (106) and mounted on a roller base (103) through a pivot pin (104), and a link (105) perpendicular to the tracking roller (102) and affixed to a bottom of the pivot pin (104) such that on sensing a misalignment of the conveyor belt (118) the link is triggered to move the pivot pin (104) which in turn moves the tracking roller (102) for aligning the conveyor belt (118).

In an embodiment the present invention provides a method of re-aligning a conveyor belt (118) by a conveyor belt aligning apparatus (100) wherein the apparatus comprises a plurality of modular tracking units (101), a linking mechanism including a connecting rope (110) passing through a link (105) of each of the modular tracking units (101), and a pair of guide rollers (111, 117), the method comprising the steps of sensing a misalignment of the conveyor belt (118) by one of the pair of guide rollers (111, 117), triggering the linking mechanism through the link (105) of one modular tracking unit of the plurality of tracking units (101) wherein the trigger moves a pivot pin (104) of the modular tracking unit (101) which in turn moves a tracking roller (102) of the unit for aligning the conveyor belt (118).

According to one embodiment of the present invention, a screw mechanism is also provided with a provision to adjust an angle of the guide roller according to a trough angle of the conveyor belt (118). A spring mechanism is additionally provided inside the screw mechanism. During a misalignment of the conveyor belt (118), the frame arm is angularly displaced which activates the spring mechanism. The spring mechanism then forces the frame arm back to an original position.

In an advantageous aspect, the present invention provides an aligning apparatus for a conveyor belt with various troughing angles to accommodate variable misalignment of the conveyor belts.

In another advantageous aspect, the present invention provides an efficient and non jamming tracking system for the conveyor belts with variable speeds.

In yet another advantageous aspect, the present invention provides an apparatus with modular assembly approach in order to suit varied sizes of a conveyor assembly.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE DRAWINGS

Various embodiment of the present invention provides a apparatus and method for conveyor belt alignment. The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "arm," "link," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

Embodiments described herein will refer to plan views and/or cross-sectional views by way of ideal schematic views. Accordingly, the views may be modified depending on simplistic assembling or manufacturing technologies and/or tolerances. Therefore, example embodiments are not limited to those shown in the views but include modifications in configurations formed on basis of assembling process. Therefore, regions exemplified in the figures have schematic properties and shapes of regions shown in the figures exemplify specific shapes or regions of elements, and do not limit the various embodiments including the example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to apparatus and method for conveyor belt alignment.

FIG. 1a-1b, 2, 3, 4, 5, 6, 7a-7c illustrates conveyor belt aligning apparatus in accordance with various embodiments of the present invention. The conveyor belt aligning apparatus (109) includes a plurality of modular tracking units (101) mounted on a pair of parallel ropes (122) with spacers (124) between each tracking unit wherein the modular units (101) are placed between a first end (109a) and a second end (109b) of a support frame (109) such that the parallel ropes (122) bend over at least one pair of pulleys (120, 121) each of the first end (109a) and the second end (109b) of the support frame (109), each of the modular tracking units (101) comprises a tracking roller (102) attached to a support bracket (106) wherein the bracket (106) is mounted on a roller base (103) through a pivot pin (104) wherein a link (105) perpendicular to the tracking roller is affixed to a bottom of the pivot pin (104). The apparatus includes a linking mechanism including a connecting rope (110) passing through the link (105) of each of the modular tracking units (101), a pair of guide rollers (111, 117) connected to the support frame (109) and the linking mechanism, wherein the conveyor belt (118) when misaligned touches one guide roller of the pair of guide rollers (111, 117) to initiate a realignment mechanism such that the touch activates the linking mechanism as the touched guide roller pulls the connecting rope (110) for enabling the links (105) of the units (101) to move in tandem and rotate the pivot (104) thereby aligning the tracking roller (102) attached to the pivot (104) for steering back the belt to centre.

In a related embodiment, the pair of guide rollers (111, 117) include a first guide roller (111) and a second guide roller (117). The first guide roller (111) is connected to the first end (109a) of the support frame (109) through a first frame arm (112) and connected to the linking mechanism through a first steering arm (115) wherein the first steering arm (115) is connected to the link of a modular tracking unit (101a) nearest to the first end (109a) of the support frame (109). The second guide roller (117) is connected to the second end (109b) of the support frame (109) through a second frame arm (119) and connected to the linking mechanism through a second steering arm (116) wherein the second steering arm (116) is connected to the link of a modular tracking unit (101b) nearest to the second end (109b) of the support frame (109).

In an embodiment, the present invention provides a tracking unit for a conveyor belt (118) aligning apparatus. The tracking unit includes a tracking roller (102) attached to a support bracket (106) and mounted on a roller base (103) through a pivot pin (104), and a link (105) perpendicular to the tracking roller (102) and affixed to a bottom of the pivot pin (104) such that on sensing a misalignment of the conveyor belt (118) the link is triggered to move the pivot pin (104) which in turn moves the tracking roller (102) for aligning the conveyor belt (118).

In an embodiment the present invention provides a method of re-aligning a conveyor belt (118) by a conveyor belt aligning apparatus (100) wherein the apparatus comprises a plurality of modular tracking units (101), a linking mechanism including a connecting rope (110) passing through a link (105) of each of the modular tracking units (101), and a pair of guide rollers (111, 117), the method comprising the steps of sensing a misalignment of the conveyor belt (118) by one of the pair of guide rollers (111, 117), triggering the linking mechanism through the link (105) of one modular tracking unit of the plurality of tracking units (101) wherein the trigger moves a pivot pin (104) of the modular tracking unit (101) which in turn moves a tracking roller (102) of the unit for aligning the conveyor belt (118).

In an embodiment, the first steering arm (115) is connected to the link of the modular tracking unit nearest to the first end (109a) of the support frame (109) through a long arm (113) of the first guide roller (111).

In an embodiment, the second steering arm (116) is connected to the link of the modular tracking unit nearest to the second end (109b) of the support frame (109) through a long arm (113a) of the second guide roller (117).

In an embodiment, each end of the pair of parallel ropes (122) is tied to a screw mechanism through the at least one pair of pulleys (120, 121), wherein the pair of parallel ropes (122) passes through a pair of guide holes (108, 108a) provided in the roller base (103) of each of the plurality of modular tracking units (101).

In an embodiment, the screw mechanism controls a relative tension of the ropes (122) on a basis of an alignment of the conveyor belt (118).

In an embodiment, the guide roller (111, 117) is moveably attached to the support frame (109) through a hinge support, wherein the hinge support is connected to the guide roller (111) through the frame arm (112).

Figure 1A:
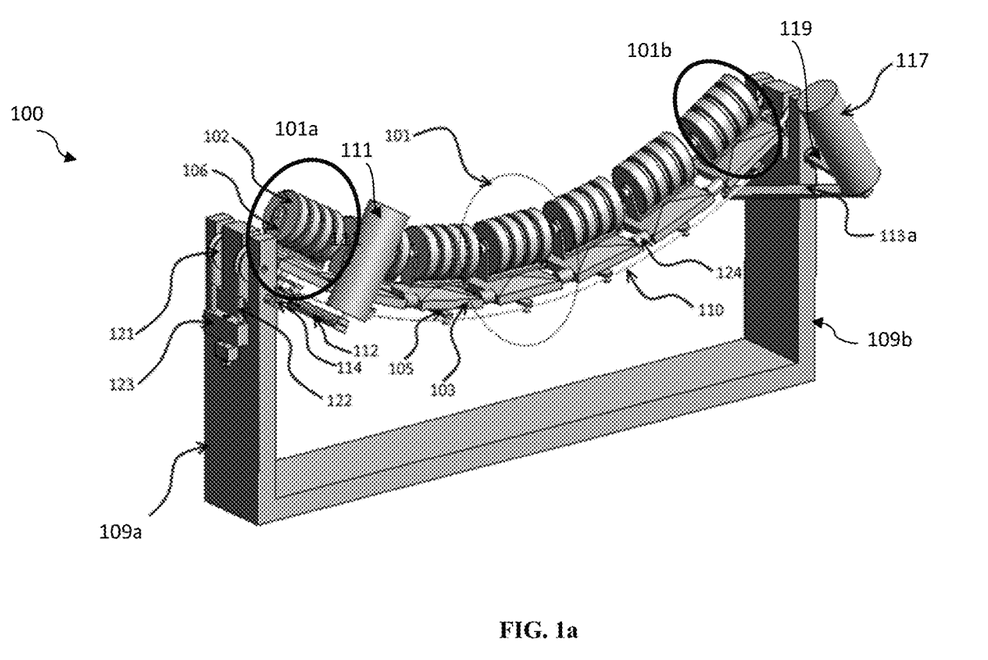
FIGS. 1a and 1b illustrates a side perspective view and a front view of a tracking system for a conveyor belt, according to one embodiment of the present invention.
Figure 1B:
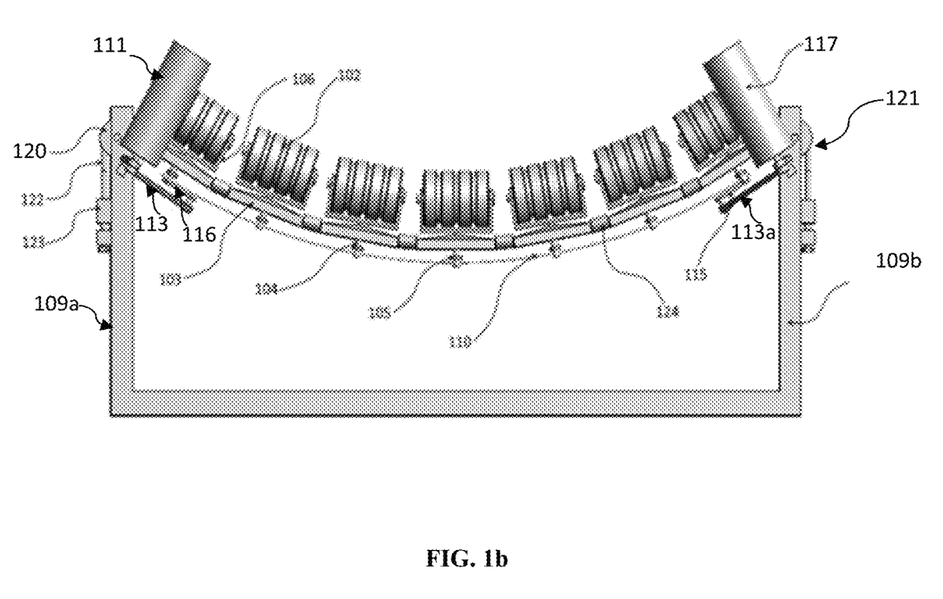

Referring to FIGS. 1a and 1b, the apparatus comprises the plurality of modular tracking units (101), a roller support, a guide module and a support frame (109). The modular tracking unit (101) comprises the plurality of interconnected tracking rollers (102) in a garland shape. The roller support forms a base for the plurality of tracking rollers through a linking mechanism. The guide module is connected to the roller support and the linking unit at a proximal position. The support frame (109) is connected to the guide module and create base for the tracking system. The linking mechanism is connected to a base position of each modular tracking unit and provides an interconnection for the support brackets. The modular tracking units are strung together on a pair of parallel ropes (122) which passes through guide holes (108) on the roller base (103). The spacers (124) are provided between the roller base to maintain a uniform distance between the modular tracking units. The pair of spacers forms an interlink between adjacent modular tracking units.

The modular tracking unit further comprises a roller shaft (not shown), a support bracket (106), a roller base (103), a pivot pin (104) and a link arm (105). Each tracking roller (102) is moveably connected between the support bracket (106) through the roller shaft. The support bracket (106) is connected to the roller base (103) further comprising a pair of guide holes (108, 108a). The roller bracket (106) is further connected to the link arm (105) through the pivot pin (104) which passes through the roller base (103). The roller support comprises at least two ropes (122), a pair of pulleys (120, 121) for each rope (122) and a screw mechanism (123). Each end of the parallel ropes (122) is tied to the screw mechanism (123) through the pulley (121). The at least two parallel ropes (122) passes through the pair of guide holes (108) provided in a roller base of the modular tracking unit. The guide module comprises a guide roller (111), a frame arm (112), and a long arm (113). The guide module is moveably attached to the support frame through a hinge support (114). The hinge support (114) is connected to the guide roller (111) through the frame arm (112).

Figure 2:
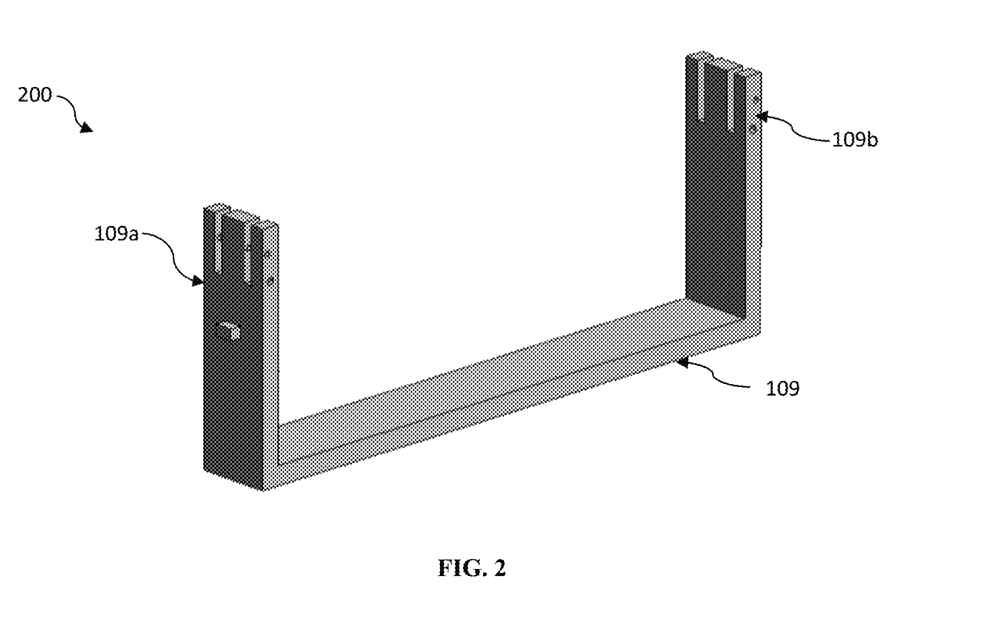
FIG. 2 illustrates a side perspective view of a support frame of the tracking system, according to one embodiment of the present invention.

FIG. 2 illustrates a side perspective view of a support frame of the tracking system, according to one embodiment of the present invention. With respect to FIG. 2, the support frame (109) is facilitating the roller support mechanism to form a U-shape and to accommodate the guide module which further connect with the modular tracking units through the link mechanism.

Figure 3:
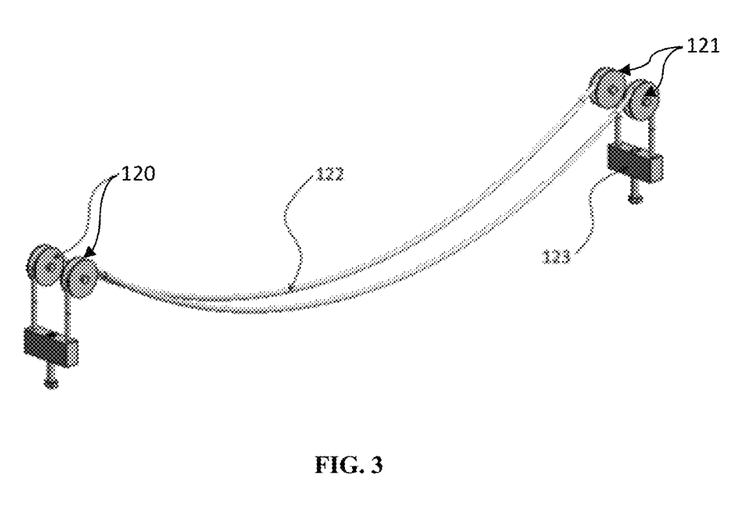
FIG. 3 illustrates a side perspective view of a roller support supported through the support frame of the tracking system, according to one embodiment of the present invention.

FIG. 3 illustrates a side perspective view of a roller support supported through the main frame of the tracking system, according to one embodiment of the present invention. With respect to FIG. 3, the roller support facilitates a distribution of load of a conveyor belt (118) from the modular tracking unit to the support frame, thus maintaining an integrity of an assembly structure of the tracking system. Each rope (122) passes through the spacers (124) which are hollow in nature and the guide holes (108) in the modular tracking unit. The pair of ropes (122) is normally a steel rope but could be chain or other rigid flexible mechanical structure coupled together for strength and flexibility. A tension of the rope is adjusted as per a weight and design of the conveyor belt (118) through the screw mechanism (123). The pair of the parallel rope (122) is connected to the screw mechanism through the pair of pulleys (120, 121).

According to one embodiment of the present invention, a single rope may be used forming a loop such that one end is fixed to the screw take up on the first vertical arm at one side of the main frame, while the cable passes through a guide hole (108) of the modular tracking units and the spacers up to the opposite side vertical arm of the main frame. The rope (122) pass over a pivoted pulley or pivoted radial grooved guide, loops over and pass back through another guide hole of the tracking units and the spacers, arrive back to the first vertical arm of the support frame. The rope (122) is then fastened to the initial screw mechanism creating a loop circuit, hence a chance in a tension or adjustment in a troughing angle on one screw mechanism has effect on whole tracking/alignment apparatus/system.

Figure 4:
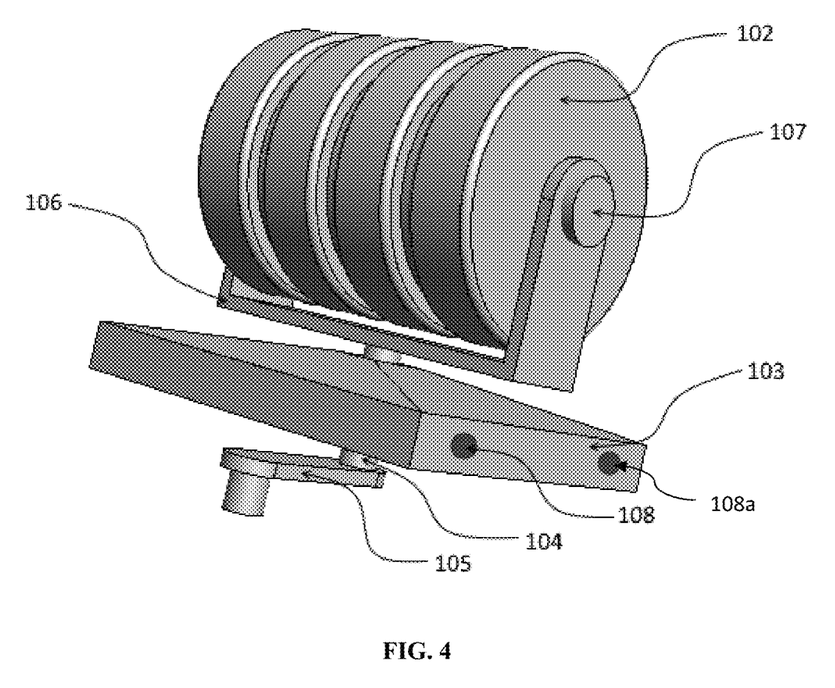
FIG. 4 illustrates a side perspective view of a modular tracking unit of the tracking system, according to one embodiment of the present invention.

FIG. 4 illustrates a side perspective view of a modular tracking unit of the tracking system, according to one embodiment of the present invention. With respect to FIG. 4, the modular tracking unit (101) comprises a plurality of tracking rollers (102) moveably fitted on the roller shaft (107) further attached to the support bracket (106). The support bracket (106) is mounted on the roller base (103) through the pivot pin (104). The pivot pin (104) allows the support bracket (106) of the modular tracking unit (101) to rotate freely about a roller axis passing through the roller shaft (107). The pivot pin (104) extends beyond the bottom of the roller base (103) to which a link arm (105) is affixed. The link arm of the modular tracking unit in proximal positions is further connected to the long arm (113) of the guide roller through steering arms (115).

According to one embodiment of the present invention, the spacers (124) are attached to the roller base in a protruding manner.

Figure 5:
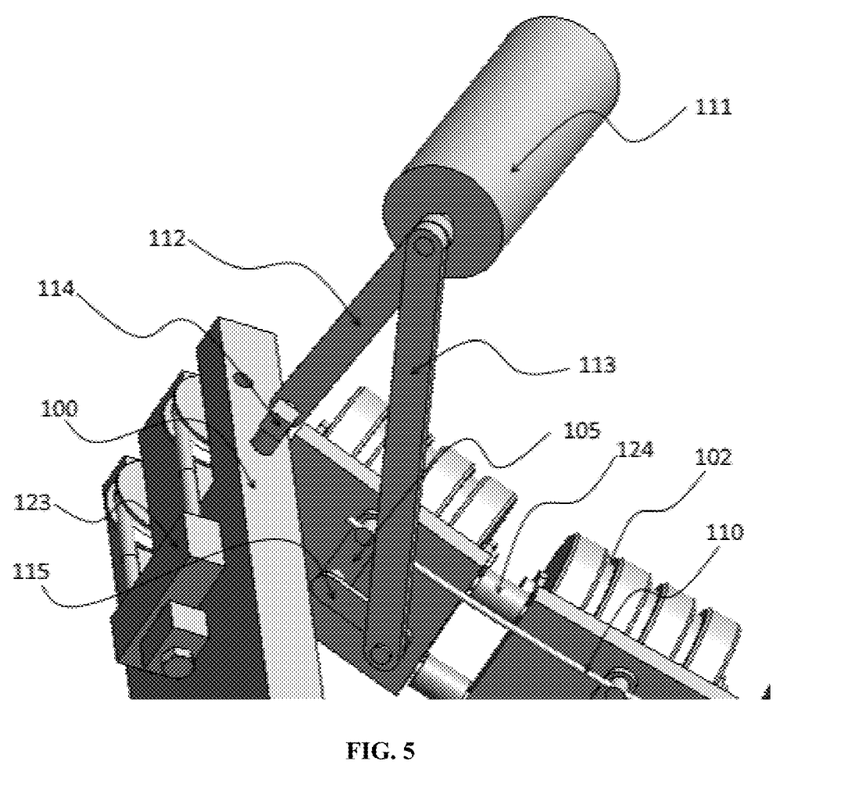
FIG. 5 illustrates a bottom perspective view of a guide module in attached to the modular tracking unit in the tracking system, according to one embodiment of the present invention.

FIG. 5 Illustrates a bottom perspective view of a guide module attached to the modular tracking unit in the tracking system, according to one embodiment of the present invention. With respect to FIG. 5, the guide module comprises at least two guide rollers (111) attached to the support frame on either side of conveyor belt (118). Each guide roller (111) is pivotally connected to a frame arm (112) at proximal end, which is coupled to the hinge support (114) provided on the support frame (109) on distal end. The hinge support (114) has the provision to adjust the angle of the guide roller (111) according to the troughing angle of the conveyor.

According to another embodiment, when the conveyor belt (118) laterally shifts away from its normal axis, it results in the belt misaligning or running mistracked. If the belt laterally shifts to one side, its edge comes into contact with the corresponding guide roller, pushing it outwards and away from the normal axis of the conveyor belt (118).

The deflection of the guide rollers from an initial position is normally limited within a range that ensures the belt remains always within the conveyor belt structure. The limited deflection of the guide rollers, in turn prevents the tracking rollers from rotating 360 degrees about its axis.

When the belt runs laterally off the central axis of the conveyor system, the belt edge comes in contact with the guide rollers in the direction of the lateral movement of the belt, tending to deflect it outwards, activating the long arm (113). The movement of the long arm in the direction of the guide roller, deflects the steering arm (115) which in turn deflects the link arm (105) thereby pulling the connecting rope (110). When the long arms (113) moves in either direction, the connecting rope also gets pulled along the same direction, which in turn makes all the link arms move in tandem towards the same direction. As the link arm is fixed to the pivot pin, the roller bracket and tracking roller rotate about their axis. The direction of the rotated tracking rollers is such that the belt is steered back towards the central axis of the conveyor system.

In an embodiment, the connecting rope (110) is a steel rope.

As the belt moves back to the central axis, a spring mechanism provided inside the hinge support forces the guide rollers to concurrently return to the normal position allowing the tracking rollers also return to their normal position.

Figure 6:
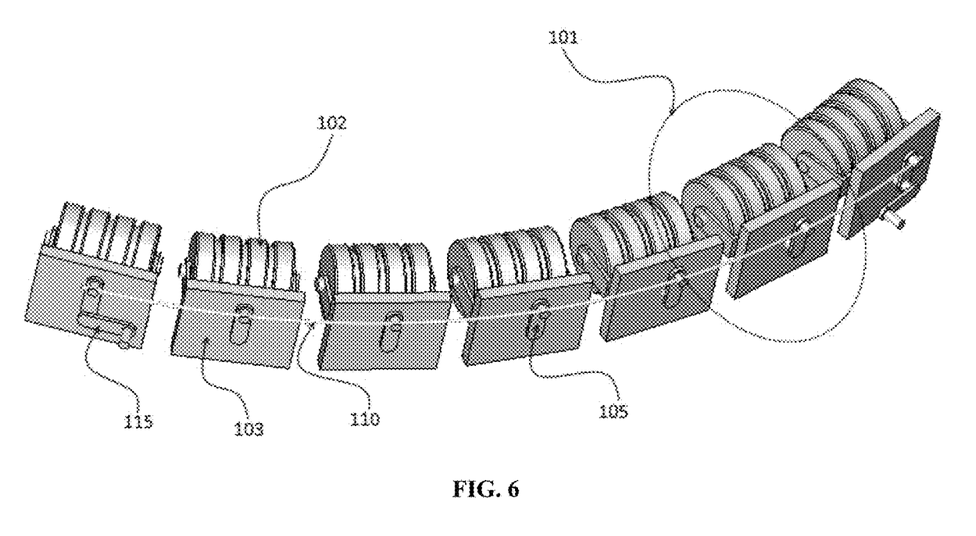
FIG. 6 illustrates a bottom perspective view of a linking unit for interconnection of the tracking rollers, according to one embodiment of the present invention.

FIG. 6 illustrates a bottom perspective view of a linking unit for interconnection of the tracking rollers, according to one embodiment of the present invention. With respect to FIG. 6, the linking unit comprises the connecting rope (110) connecting each pivot pin of the individual tracking rollers through their respective link arms (105). The connecting rope is fastened to the pivot pin of the proximally placed modular tracking units. The link arms of the modular tracking units at either ends, are locked to steering arms respectively. The steering arms of the distal modular tracking units on either side are connected to long arms of guide roller assembly. When the long arms move in either direction, the connecting rope also gets pulled along the same direction, which in turn makes all the link arms move in tandem towards the same direction. This movement of the link arms rotate the pivot pin about its axis, which in turn rotates the roller bracket and thereby tracking roller attached to them.

According to one embodiment of the present invention, the tracking system is installed in the same manner as a conventional idler frame. Once installed the screw mechanism (123) is adjusted till all the tracking rollers (102) are in touch with the bottom side of the conveyor belt (118). The guide rollers (111) are positioned close to the outer edge of the normal and true running belt.

Figure 7A:
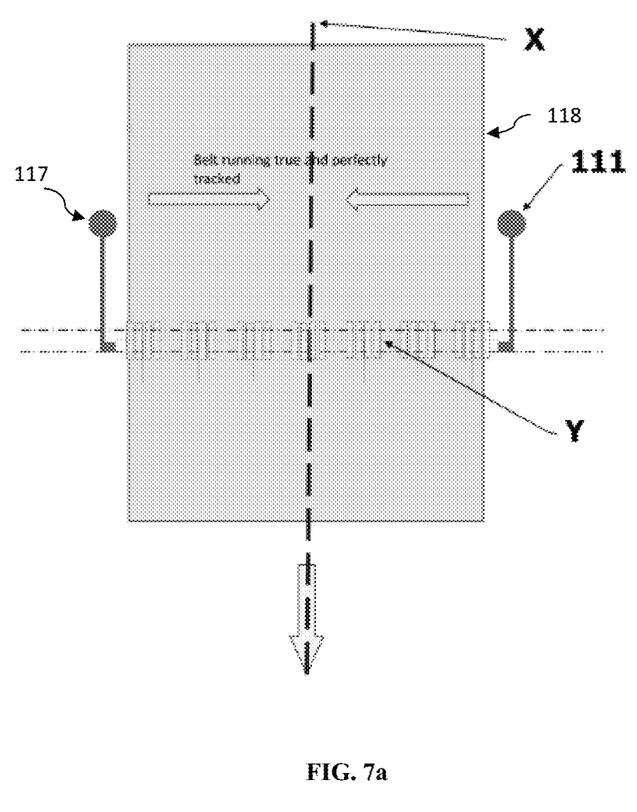
FIG. 7a-7c illustrates an axial movement of the conveyor belt with respect to the tracking system, according to one embodiment herein.
Figure 7B:
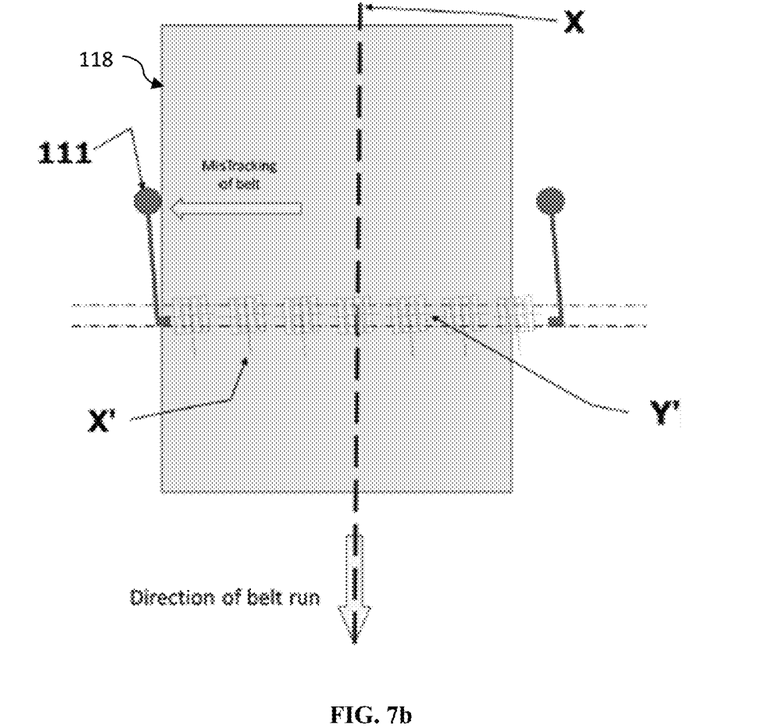
Figure 7C:
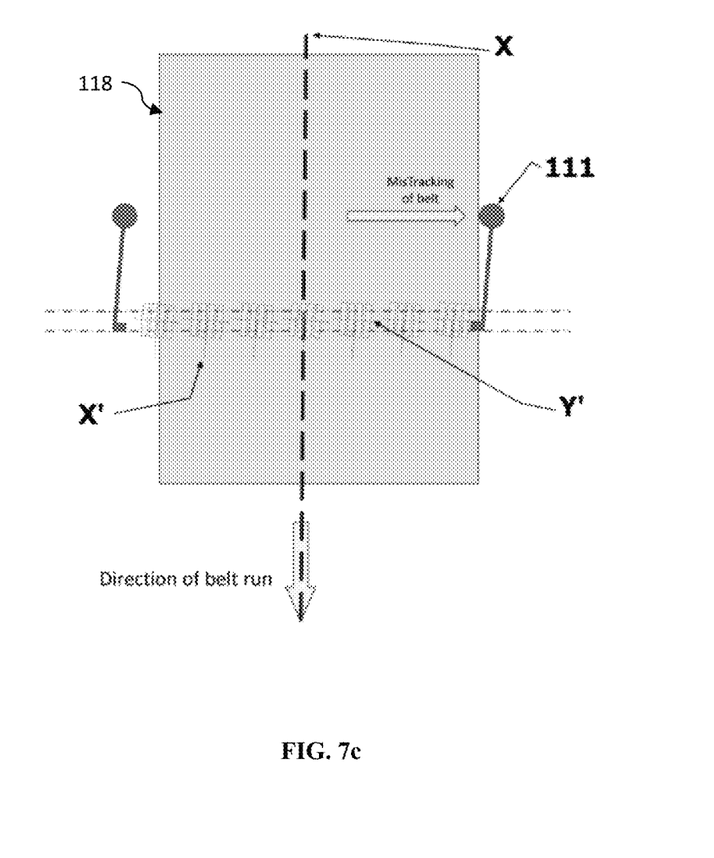

FIG. 7a-7c illustrates an axial movement of the conveyor belt (118) with respect to the tracking system, according to one embodiment herein. With respect to FIG. 7a, the conveyor belt (118) runs to its normal axis (X), which is perpendicular to axis (Y) of tracking roller. The guide rollers stay at a pre-defined distance. A lateral shifting of the conveyor belt (118) away from a normal axis (X) results in a belt misalignment. The lateral shifting of the conveyor belt (118) to one side bring an edge of the conveyor belt (118) in contact with the corresponding guide roller (111) as shown in FIG. 7b and FIG. 7c, pushing the guide rollers outwards and away from the normal axis (X) of the conveyor. As the guide rollers (111) are connected to the long arms (113), the movement of the guide roller causes the long arm to move in the same direction.

When the steering arms moves in either direction, the connecting rope also gets pulled in the same direction making the link arms to move in tandem towards the same direction. The said movement of the link arms rotate the pivot pin about its axis, which in turn rotates the support bracket and further, the tracking roller attached to them. As a result of this, axis of the tracking roller is changed (Y') thereby shifting the axis (X') of the running belt to its original direction, which facilitates the running of conveyor belts true.

The present apparatus facilitates a variable angular movement and coverage creating a utility with the conveyor belts of any troughing angle. Also, the conveyor belt runs in full contact with all the tracking rollers. Further, as all the tracking rollers of modular tracking units rotate independent of each other, chances of jamming of the tracking rollers are very less. The present tracking system is also easy to handle and repair thereby reducing costs.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

We claim:

1. A conveyor belt (118) aligning apparatus comprising:
a plurality of modular tracking units (101) mounted on a pair of parallel ropes (122) with spacers (124) between each tracking unit wherein the modular units (101) are placed between a first end (109a) and a second end (109b) of a support frame (109) such that the parallel ropes (122) bend over at least one pair of pulleys (120, 121) each of the first end (109a) and the second end (109b) of the support frame (109);
each of the modular tracking units (101) comprises a tracking roller (102) attached to a support bracket (106) wherein the bracket (106) is mounted on a roller base (103) through a pivot pin (104) wherein a link (105) perpendicular to the tracking roller is affixed to a bottom of the pivot pin (104);
a linking mechanism including a connecting rope (110) passing through the link (105) of each of the modular tracking units (101);
a pair of guide rollers (111, 117) connected to the support frame (109) and the linking mechanism;
wherein the conveyor belt (118) when misaligned touches one guide roller of the pair of guide rollers (111, 117) to initiate a realignment mechanism such that the touch activates the linking mechanism as the touched guide roller pulls the connecting rope (110) for enabling the links (105) of the units (101) to move in tandem and rotate the pivot (104) thereby aligning the tracking roller (102) attached to the pivot (104) for steering back the belt to centre.

2. The apparatus of claim 1 wherein the at least one pair of pulleys (120, 121) is attached to the first end (109a) and the second end (109b).

3. The apparatus of claim 1 wherein the pair of guide rollers (111, 117) include a first guide roller (111) and a second guide roller (117).

4. The apparatus of claim 3 wherein the first guide roller (111) is connected to the first end (109a) of the support frame (109) through a first frame arm (112) and connected to the linking mechanism through a first steering arm (115) wherein the first steering arm (115) is connected to the link of a modular tracking unit (101a) nearest to the first end (109a) of the support frame (109).

5. The apparatus of claim 3 wherein the second guide roller (117) is connected to the second end (109b) of the support frame (109) through a second frame arm (119) and connected to the linking mechanism through a second steering arm (116) wherein the second steering arm (116) is connected to the link of a modular tracking unit (101b) nearest to the second end (109b) of the support frame (109).

6. The apparatus of claim 4 wherein the first steering arm (115) is connected to the link of the modular tracking unit nearest to the first end (109a) of the support frame (109) through a long arm (113) of the first guide roller (111).

7. The apparatus to claim 5 wherein the second steering arm (116) is connected to the link of the modular tracking unit nearest to the second end (109b) of the support frame (109) through a long arm (113a) of the second guide roller (117).

8. The apparatus of claim 1, wherein each end of the pair of parallel ropes (122) is tied to a screw mechanism through the at least one pair of pulleys (120, 121), wherein the pair of parallel ropes (122) passes through a pair of guide holes (108, 108a) provided in the roller base (103) of each of the plurality of modular tracking units (101).

9. The apparatus as claimed in claim 8, wherein the screw mechanism controls a relative tension of the ropes (122) on a basis of an alignment of the conveyor belt (118).

10. The apparatus as claimed in claim 4, wherein the guide roller (111, 117) is moveably attached to the support frame (109) through a hinge support, wherein the hinge support is connected to the guide roller (111) through the frame arm (112).

11. A modular tracking unit for a conveyor belt (118) aligning apparatus, the tracking unit comprises:
a tracking roller (102) attached to a support bracket (106) and mounted on a roller base (103) through a pivot pin (104); and
a link (105) perpendicular to the tracking roller (102) and affixed to a bottom of the pivot pin (104) such that on sensing a misalignment of the conveyor belt (118) the link is triggered to move the pivot pin (104) which in turn moves the tracking roller (102) for aligning the conveyor belt (118).

12. The modular tracking unit of claim 11 wherein the link is triggered by one of a pair of guide rollers (111, 117) on sensing misalignment.

13. The modular tracking unit as claimed in claim 11 wherein the support bracket (106) swing on the pivot (104) which is mounted on the roller base (103).

14. A method of re-aligning a conveyor belt (118) by a conveyor belt aligning apparatus (100) wherein the apparatus comprises a plurality of modular tracking units (101), a linking mechanism including a connecting rope (110) passing through a link (105) of each of the modular tracking units (101), and a pair of guide rollers (111, 117), the method comprising the steps of:
sensing a misalignment of the conveyor belt (118) by one of the pair of guide rollers (111, 117), and
triggering the linking mechanism through the link (105) of one modular tracking unit of the plurality of tracking units (101) wherein the trigger moves a pivot pin (104) of the modular tracking unit (101) which in turn moves a tracking roller (102) of the unit for aligning the conveyor belt (118).

15. The method of claim 14 further comprising the step of pulling the connecting rope of the linking mechanism through the guide roller (111) sensing the misalignment, thereby enabling the links (105) of the plurality of modular tracking units (101) to move in tandem and rotate the pivot (104) through the link to move the tracking roller (102) attached to the pivot.

16. The method of claim 15 wherein the guide roller (111) returns to original position once the conveyor belt (118) is back at centre.

* * * * *